United States Patent [19]

Lin

[11] Patent Number: 5,432,496
[45] Date of Patent: Jul. 11, 1995

[54] ELECTRONIC DISPLAY DEVICE

[76] Inventor: Kuo-Lung Lin, No. 27, Lane 45, Hsi-An St., Hu-Wei Town, Yunlin County, Taiwan

[21] Appl. No.: 227,409

[22] Filed: Apr. 14, 1994

[51] Int. Cl.⁶ .................... B60Q 1/26; B60Q 227/424
[52] U.S. Cl. .................................... 340/468; 340/461; 340/525; 340/457; 362/83.1; 364/708.1; 40/900
[58] Field of Search .............. 340/461, 467, 479, 525, 340/457.4, 457, 815.4; 362/80.1, 83.1; 364/708; 40/900

[56] References Cited

U.S. PATENT DOCUMENTS 4,983,951  1/1991  Igarashi et al. .................... 340/461

Primary Examiner—John K. Peng
Assistant Examiner—Daryl C. Pope
Attorney, Agent, or Firm—Morton J. Rosenberg; David I. Klein

[57] ABSTRACT

An electronic display device includes a housing having a sliding slot, an electronic display board received inside the housing and moved to extend out of the housing through the sliding slot, the electronic display board having a digital display screen on a front side thereof for display a telephone number or the like and a keyboard on a back side thereof for inputting the telephone number or the like to be displayed, and a motor-driven transmission mechanism controlled to move the electronic display board in or out of the housing.

3 Claims, 10 Drawing Sheets

ELECTRONIC DISPLAY DEVICE

BACKGROUND OF THE INVENTION

The present invention relates to an electronic display device for showing a message and a contact telephone number while a vehicle is in a parking place.

In cities, it is difficult to find a parking lot for parking a car. For temporary parking, one may park the car in any available place nearby the building one visits. However, carelessly parking the car in any available place may obstruct traffic flow and invite disputes. Therefore, people tend to leave a message on a paper sheet on the car after parking, indicating the telephone number to contact.

SUMMARY OF THE INVENTION

The present invention has been accomplished to provide an electronic display device for leaving a contact telephone number on a parked car.

According to the present invention, the electronic display device comprises a housing having a sliding slot, an electronic display board received inside the housing and moved to extend out of the housing through the sliding slot, the electronic display board having a digital display screen on a front side thereof for display a telephone number or the like and a keyboard on a back side thereof for inputting the telephone number or the like to be displayed, and a motor-driven transmission mechanism controlled to move the electronic display board in or out of the housing. The housing can be the casing of an automobile's rear view mirror or third stop light, or an independent box.

DETAILED DESCRIPTION OF THE PREFERRED EMBODIMENT

Figure 1:
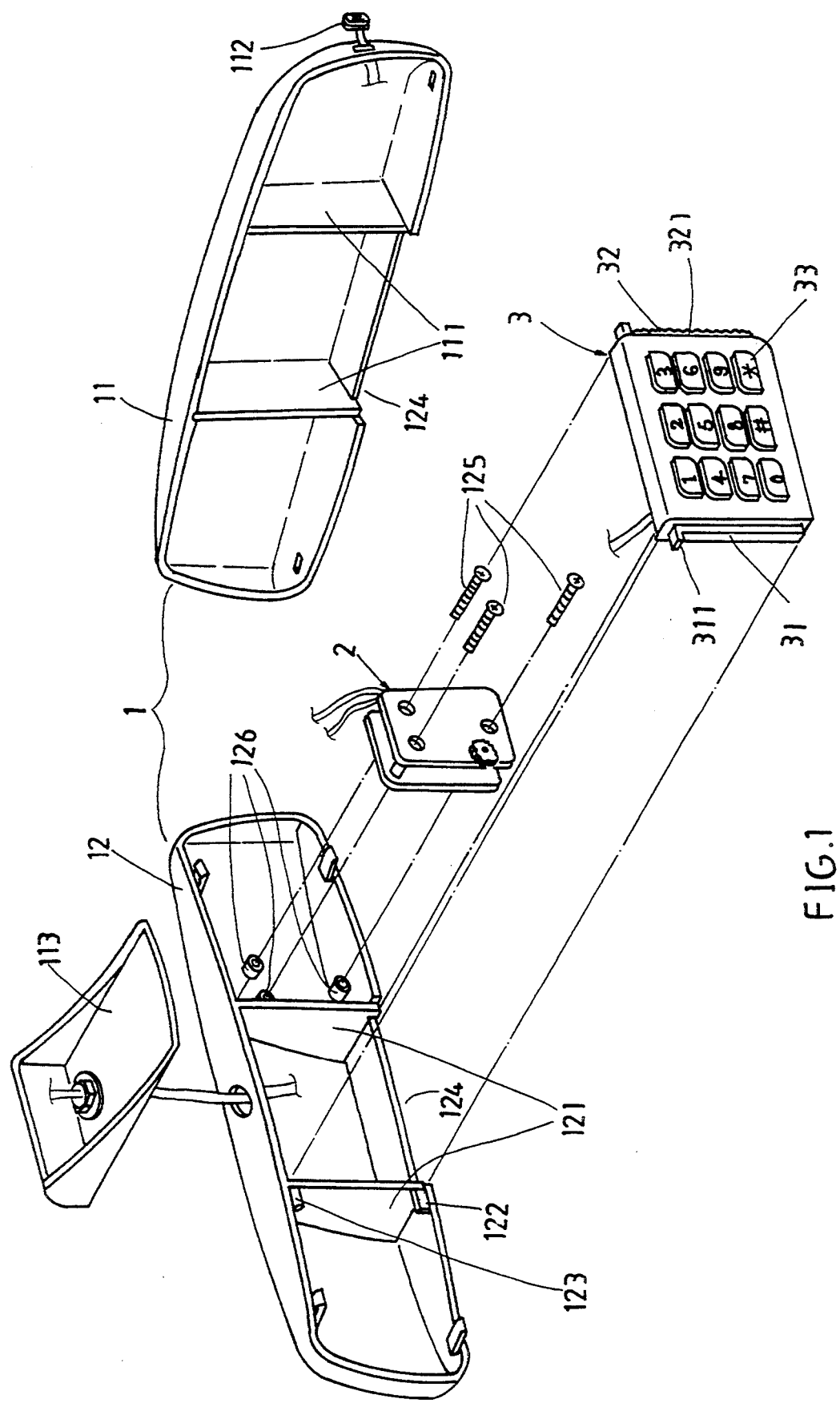
FIG. 1 is an exploded view of an electronic display device according to one embodiment of the present invention.
Figure 2:
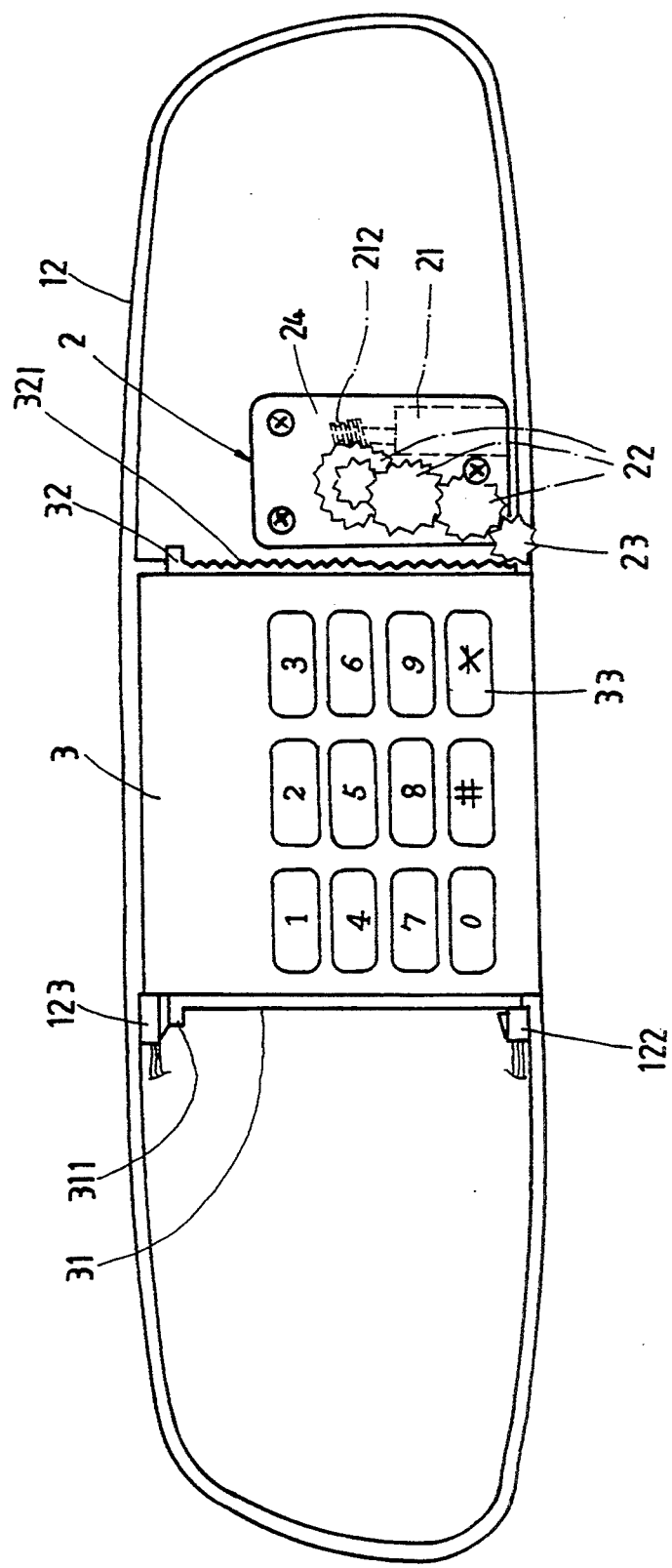
FIG. 2 is an elevation view of the electronic display device shown in FIG. 1.
Figure 3:
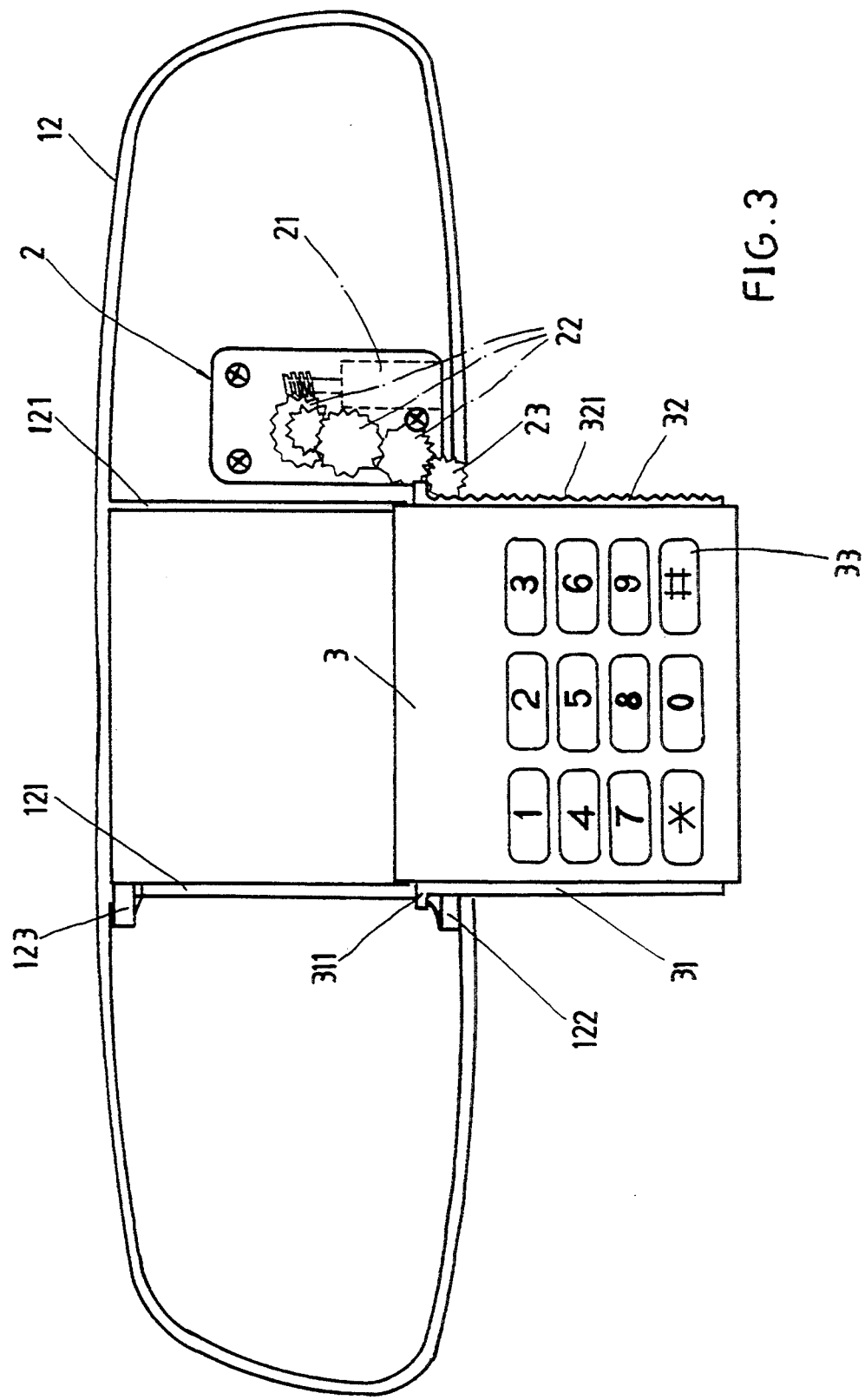
FIG. 3 is a view similar to that FIG. 2 showing the electronic display board extended from the housing for display.
Figure 4:
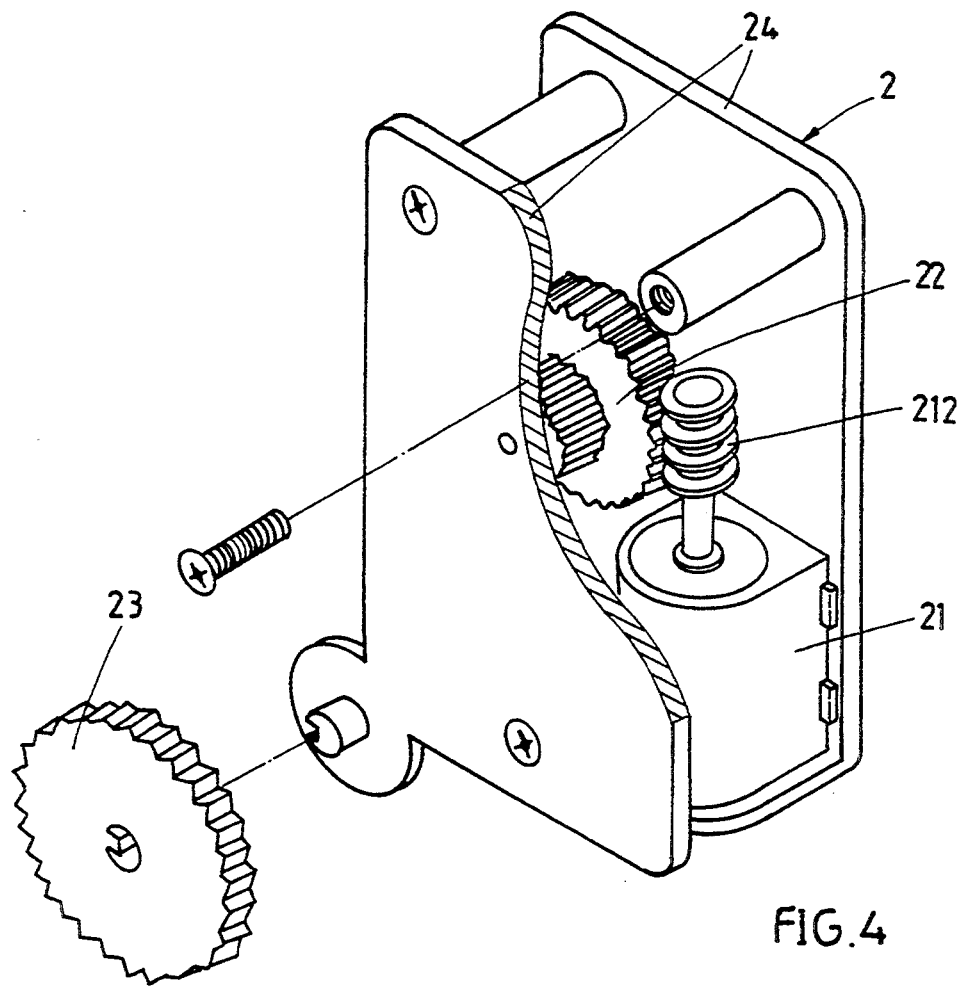
FIG. 4 is a partially exploded view of the transmission mechanism of the electronic display device shown in FIG. 1.
Figure 5:
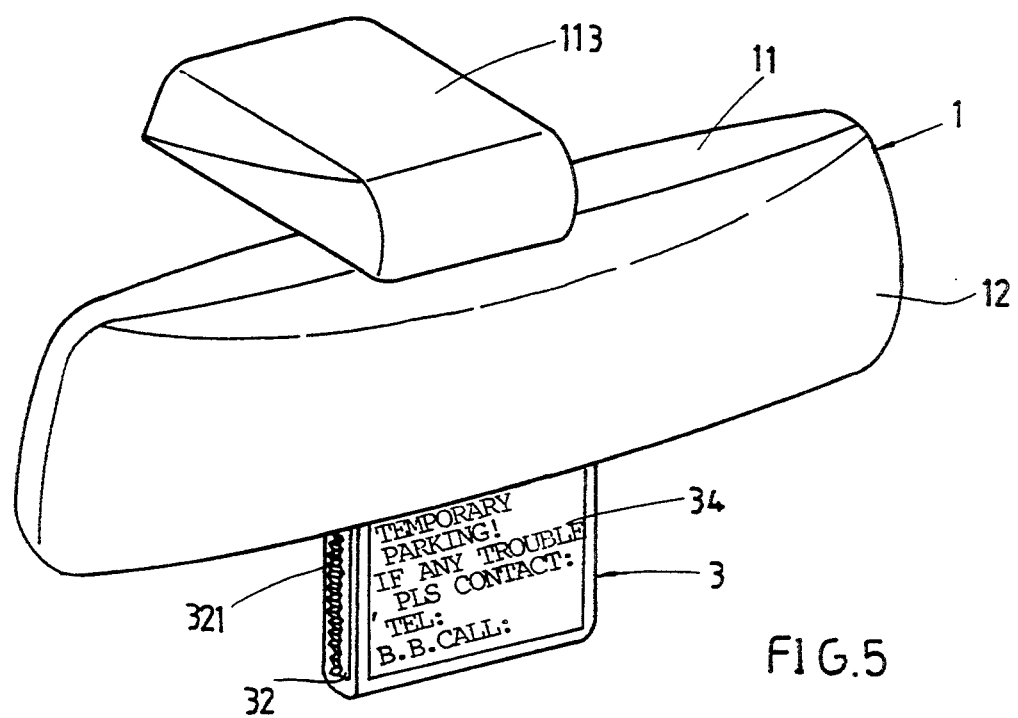
FIG. 5 is a front perspective view of the electronic display device shown in FIG. 1, showing the electronic display board extended from the housing.
Figure 6:
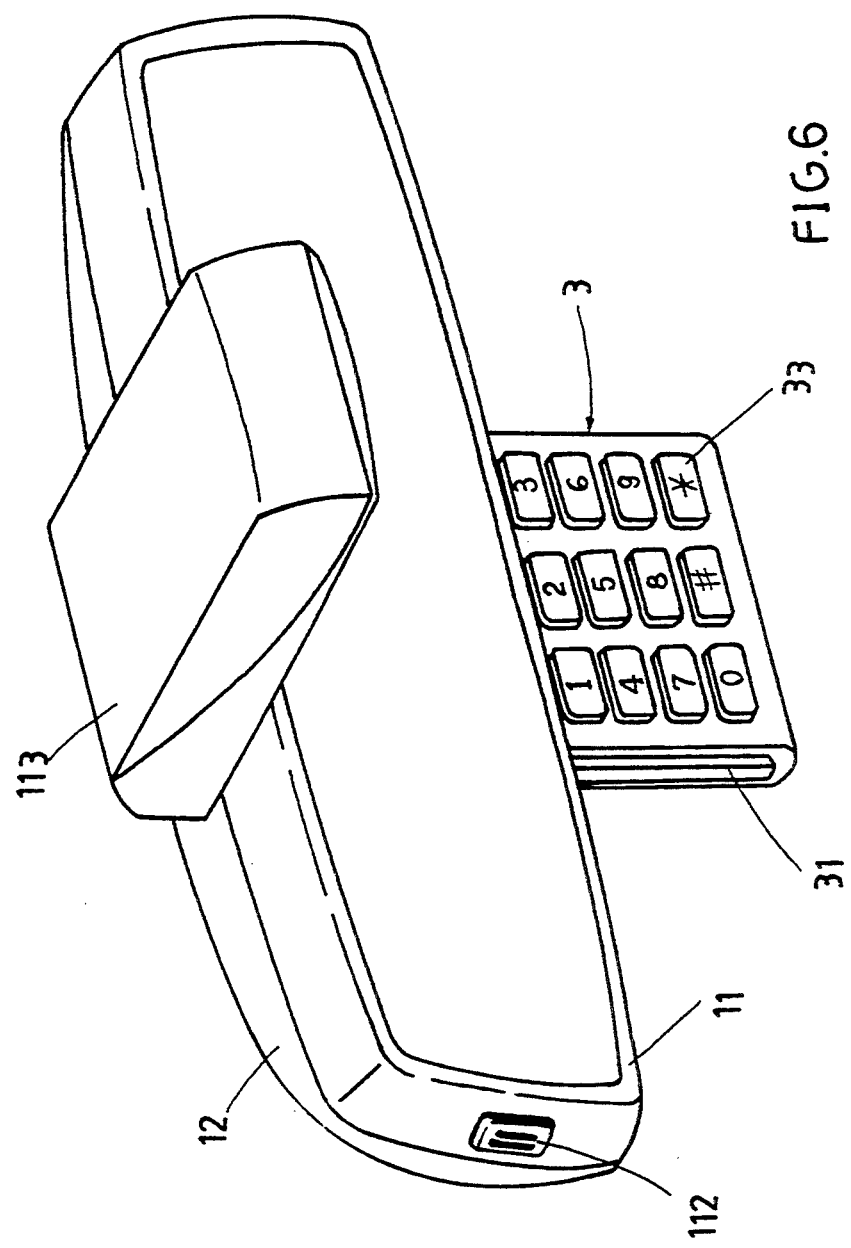
FIG. 6 is a back perspective view of the electronic display device shown in FIG. 5.
Figure 7:
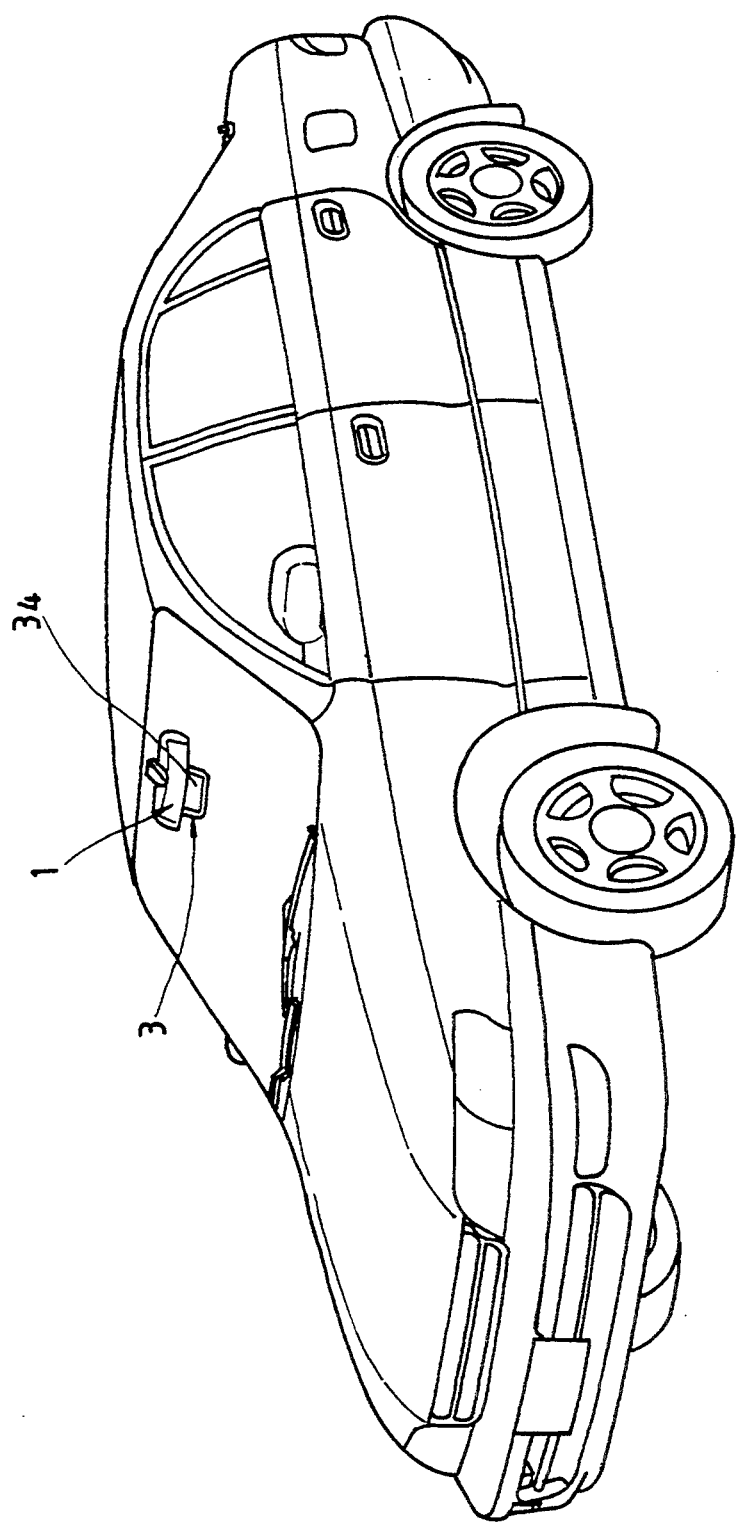
FIG. 7 is perspective view showing the electronic display device of FIG. 1 installed in an automobile.
Figure 8:
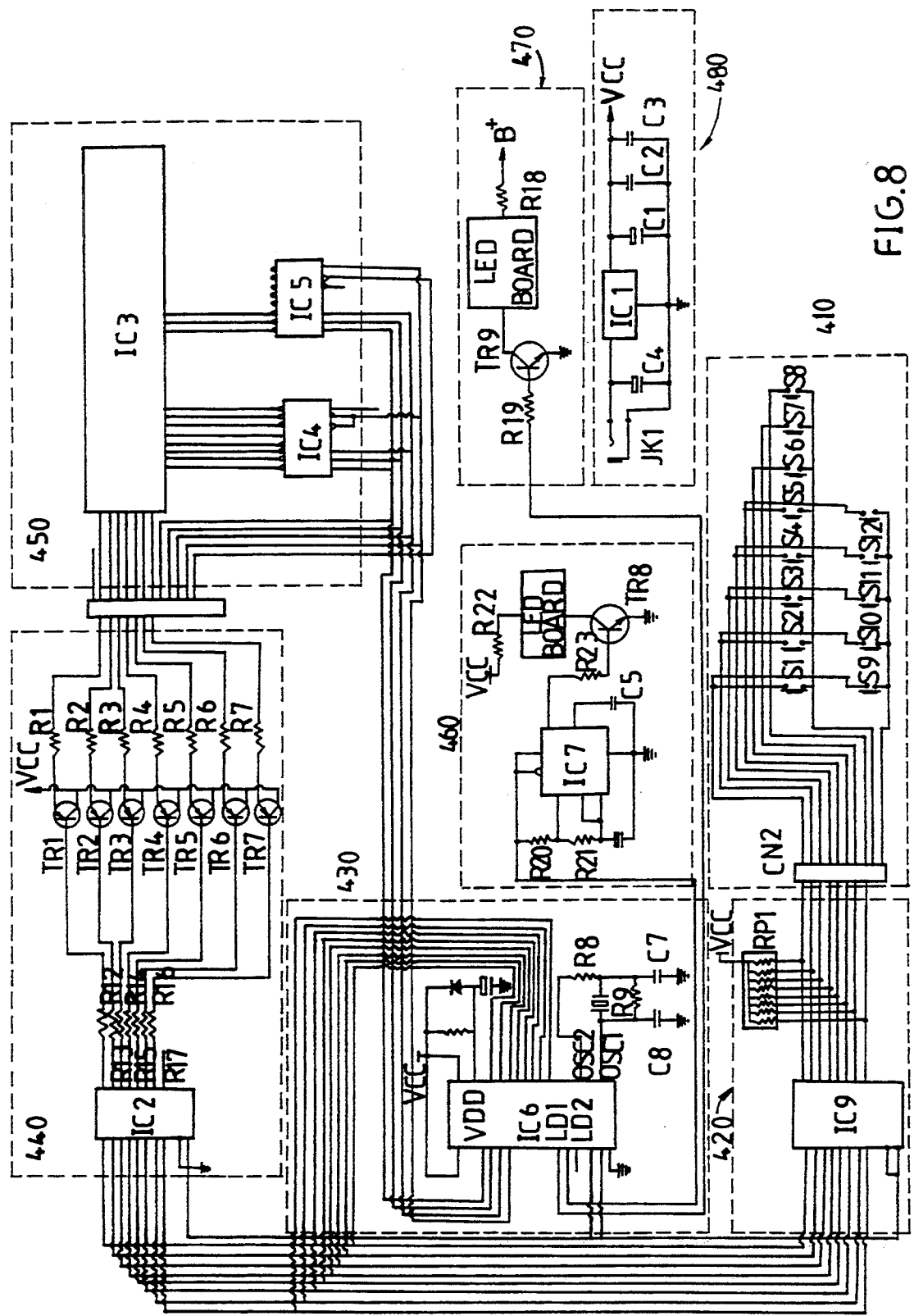
FIG. 8 is a circuit diagram of the control circuit for the electronic display device shown in FIG. 1.
Figure 9:
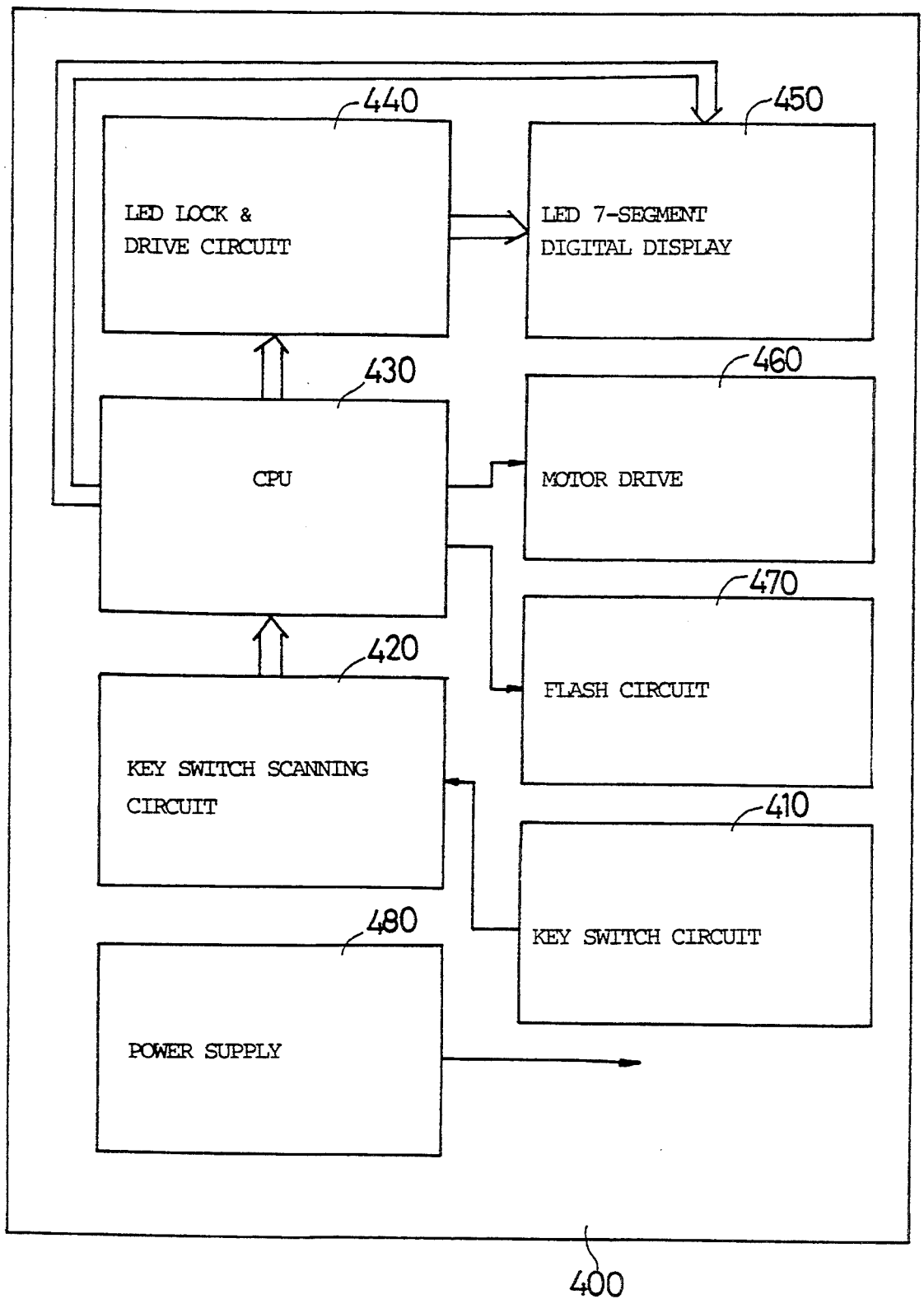
FIG. 9 is a block diagram showing the operation of the control circuit according to the present invention.

Referring to FIGS. 1 through 7, an electronic display device in accordance with the present invention is generally comprised of a automobile rear view mirror 1, which includes a front cover shell 12 and a back cover shell 11, a transmission mechanism 2, an electronic display board 3, two limit switches 122;123, and a control circuit 400 (see FIGS. 8 and 9).

The front and back cover shells 11;12 comprise each two symmetrical partition walls 111 or 121. When the front and back cover shells 11;12 are connected together, a sliding slot 124 is defined between the partition walls 111;121. The electronic display board 3 is made to slide in the sliding slot 124, having two side rails, namely, the first side rail 31 and the second side rail 32 on two opposite lateral sides thereof. The first side rail 31 has an outward extension rod 311 at the top, which when the electronic display board 3 is driven by the transmission mechanism 2 to move upward or downward in the sliding slot 124 will touch either limit switch 122 or 123 causing it to change the moving direction of the transmission mechanism 2. The second side rail 32 has a toothed portion 321 on the outside along the length thereof. The transmission mechanism 2 comprises a casing 24 fastened to screw holes 126 on the back cover shell 12 by screws 125, a reversible motor 21 received inside the back cover shell 12 and having a worm gear 212 on the output end thereof, a transmission gear 22 disposed inside the casing 24 and meshed with the worm gear 212, an output gear 23 disposed outside the casing 24 and meshed with the toothed portion 321 of the second side rail 32 and driven by the transmission gear 22 to move the electronic display board 3 in the sliding slot 124. The electronic display board 3 has a screen 34 at one side for display and a keyboard 33 at an opposite side for inputting the telephone or B.B. Call number to contact. A short message of "Temporary Parking! If any trouble, please contact:" is printed on the screen 34 above the area for showing the telephone and BB call numbers. Furthermore, the electric circuit may be inserted through the rear view mirror mounting frame 113 and connected to the electric circuit of the automobile. An on/off switch 112 is mounted on the outside for controlling the operation of the reversible motor 21.

Referring to FIGS. 8 and 9, the control circuit 400 comprises a power supply 480, a key switch circuit 410, a key switch scanning circuit (IC9) 420, a single chip CPU (IC6) 430, a lock & drive circuit 440, a 7-segment digital display (IC3;IC4;IC5) 450, a reversible motor drive (IC7) 460, and a flash circuit 470. The power supply 480 provides the necessary working voltage for the control circuit. The key switch circuit 410 is for input instructions. When an instruction is give through the key switch circuit 410, it is scanned by the key switch scanning circuit 420, and then the scanned signal is sent to the CPU 430 for decoding. When decoded, the CPU 430 gives a signal to the lock & drive circuit causing it to turn on the LED 7-segment digital display 450 and show the content of the signal through the LED 7-segment digital display 450. The CPU 430 simultaneously gives a signal to the reversible motor drive 460 causing it to turn on the aforesaid reversible motor 21, and a signal to the flash circuit 470 causing it to flash.

Figure 10:
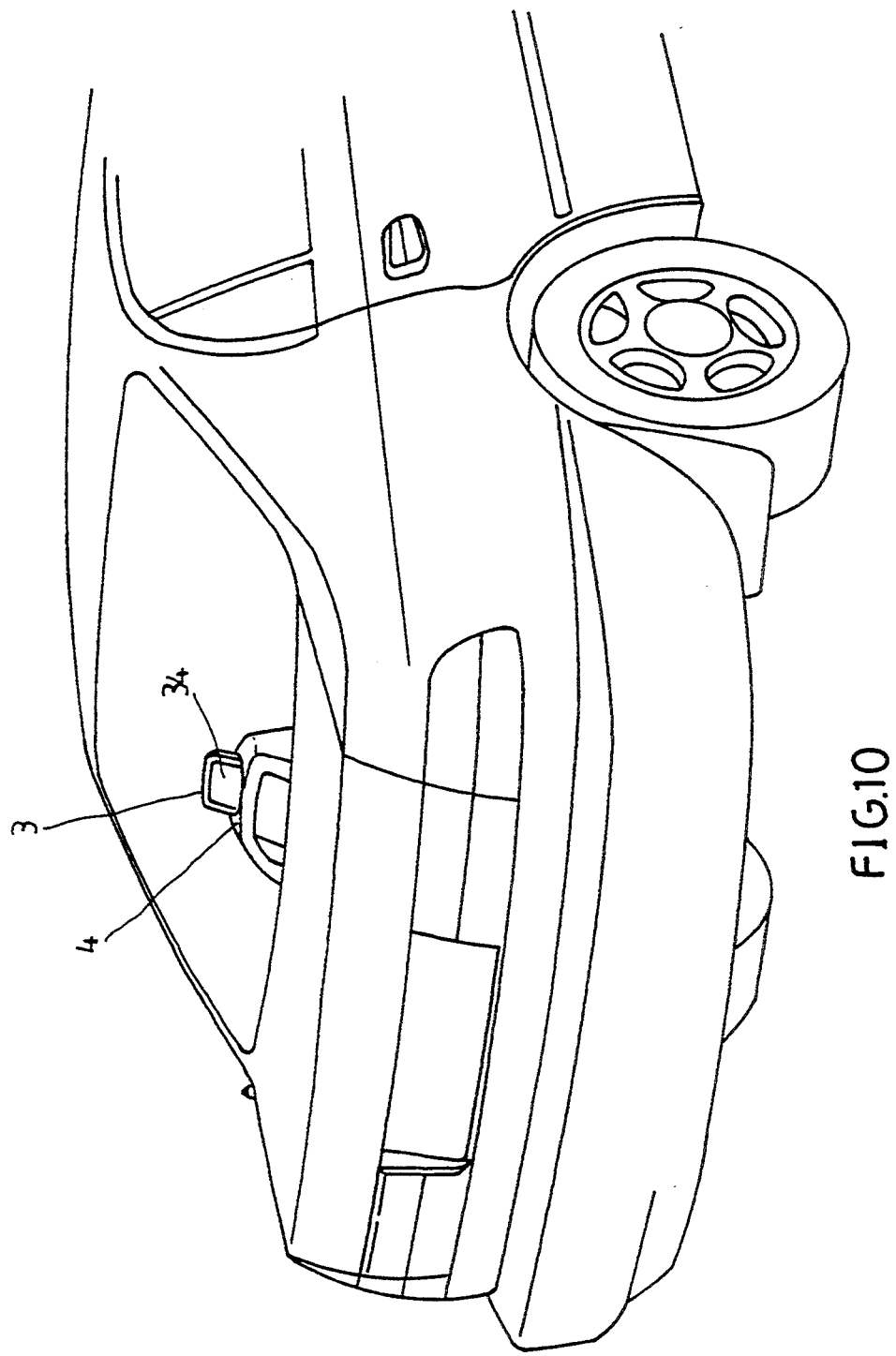
FIG. 10 shows a perspective view of the present invention installed in an automobile's third stop light.

Referring to FIG. 10, the aforesaid structure may be made in a third stop light 4, permitting the electronic display board 3 to be received inside the casing of the third stop light 4 and extended out of the casing for showing the message.

Figure 11:
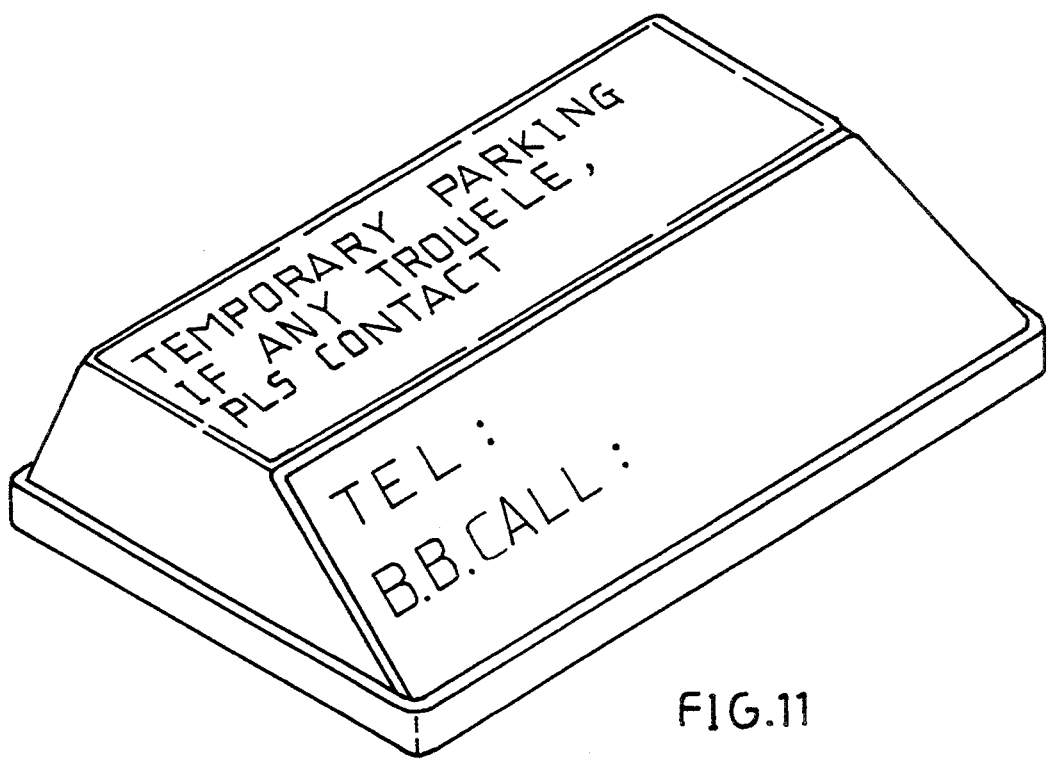
FIG. 11 shows a perspective view of the present invention installed in an independent box.
Figure 12:
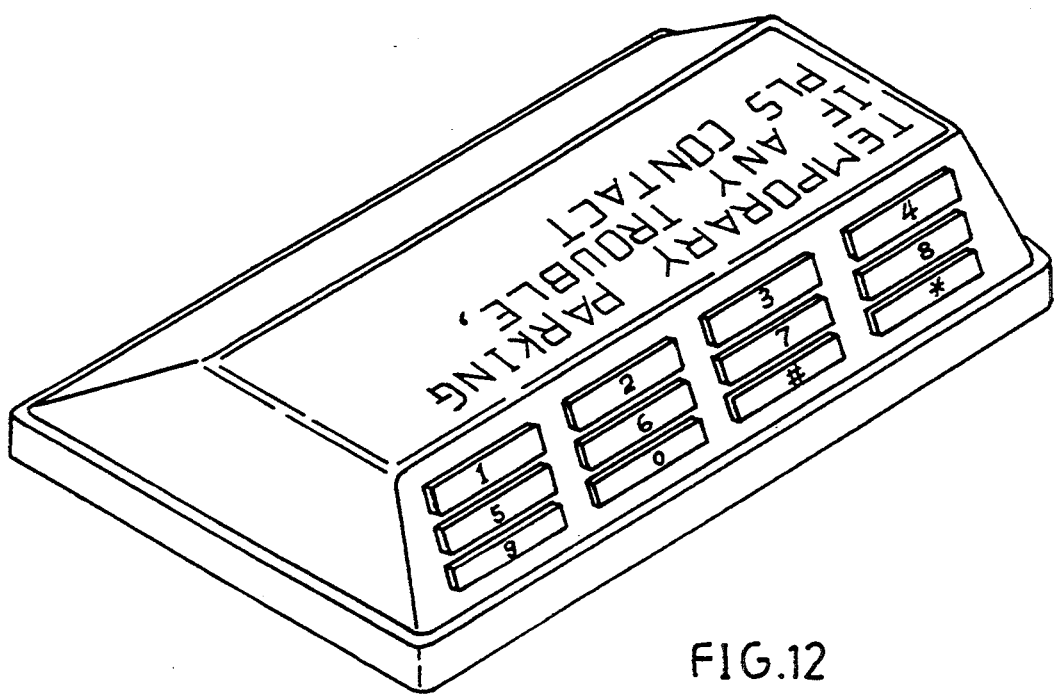
FIG. 12 is a rear perspective view of the embodiment shown in FIG. 11.

Referring to FIGS. 11 and 12, the aforesaid structure may be made in an independent box which has a battery power supply on the inside.

What is claimed is:

1. An electronic display device comprising:

a housing having a slotted through opening formed therein;

an electronic display board slidably disposed within said housing and extendable from said housing through said slotted through opening, said electronic display board comprising a digital display screen disposed on a front side thereof, a keyboard disposed on a back side thereof for inputting series of numbers for display on said digital display screen, a rack formed on one lateral side thereof, and a rod member extending from an opposing lateral side thereof;

a transmission mechanism installed inside said housing and controlled to move said electronic display board in and out of said housing, said transmission mechanism comprising a reversible motor having a worm gear mounted on an output shaft thereof, a transmission gear having an input gear meshed with said worm gear and an output gear meshed with said rack;

a control circuit disposed within said housing having an output coupled to said reversible motor for controlling a rotational direction of said motor output shaft, said rotational direction being reversed responsive to a control signal; and, two limit switches mounted inside said housing at different elevations and adjacent one lateral side of said electronic display, said limit switches being coupled to an input of said control circuit, one of said two limit switches being located in relation to said extension rod of said electronic display board to be operated by said extension rod when said electronic display board is fully extended from said housing and provide said control signal, another of said two limit switches being located in relation to said extension rod to be operated by said extension rod when said electronic display board is fully retracted and thereby provide said control signal.

2. The electronic display device of claim 1 wherein said housing is the casing of an automobile rear view mirror.

3. The electronic display device of claim 1 wherein said housing is the casing of an automobile's third stop light.

* * * * *